(12) United States Patent
Szeliski et al.

(10) Patent No.: US 7,712,052 B2
(45) Date of Patent: May 4, 2010

(54) APPLICATIONS OF THREE-DIMENSIONAL ENVIRONMENTS CONSTRUCTED FROM IMAGES

(75) Inventors: Richard S. Szeliski, Bellevue, WA (US); Blaise H. Aguera y Arcas, Seattle, WA (US); Tomasz S. M. Kasperkiewicz, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 947 days.

(21) Appl. No.: 11/461,315

(22) Filed: Jul. 31, 2006

(65) Prior Publication Data

US 2008/0028341 A1 Jan. 31, 2008

(51) Int. Cl.
*G06F 3/048* (2006.01)
*G06F 17/00* (2006.01)
*G06T 15/00* (2006.01)

(52) U.S. Cl. ................... 715/854; 345/419; 715/205
(58) Field of Classification Search .............. 715/205, 715/854; 345/419
See application file for complete search history.

(56) References Cited

U.S. PATENT DOCUMENTS

| 6,031,989 | A * | 2/2000 | Cordell ................. 717/109 |
|---|---|---|---|
| 6,629,097 | B1 * | 9/2003 | Keith ........................... 707/5 |
| 6,724,407 | B1 * | 4/2004 | Cheng ........................ 715/848 |
| 7,350,236 | B1 * | 3/2008 | Silverbrook et al. .......... 726/26 |
| 2002/0049786 | A1 * | 4/2002 | Bibliowicz et al. .......... 707/511 |
| 2002/0129058 | A1 * | 9/2002 | Story et al. .................. 707/513 |
| 2003/0081010 | A1 * | 5/2003 | Chang et al. ................ 345/835 |
| 2003/0149939 | A1 * | 8/2003 | Hubel et al. ................ 715/526 |
| 2004/0205498 | A1 * | 10/2004 | Miller .................... 715/501.1 |
| 2004/0210845 | A1 * | 10/2004 | Paul et al. .................. 715/731 |
| 2004/0250205 | A1 * | 12/2004 | Conning .................... 715/517 |
| 2005/0086612 | A1 * | 4/2005 | Gettman et al. ............ 715/848 |
| 2005/0138564 | A1 * | 6/2005 | Fogg .......................... 715/745 |

* cited by examiner

*Primary Examiner*—Stephen S Hong
*Assistant Examiner*—Marshon Robinson
(74) *Attorney, Agent, or Firm*—Shook Hardy & Bacon LLP (57) ABSTRACT

Applications that extend the basic concept of determining spatial relationships between images and generating a model allowing users to experience the images in a 3D environment are provided. One application is directed to the creation of documents that may be readily shared, viewed, and edited, wherein the documents include references to underlying content comprising a 3D environment and images positioned therein and captures connections between images. Another application relates to ranking images based on user viewing information, such as the number of users who have viewed an image and how long an image was viewed. Yet another application is directed to analyzing the spatial density of images within a 3D environment to determine points of user interest. A further application relates to using spatially indexed images to navigate between webpages and 3D environments.

22 Claims, 5 Drawing Sheets

APPLICATIONS OF THREE-DIMENSIONAL ENVIRONMENTS CONSTRUCTED FROM IMAGES

BACKGROUND

Over the past decade, the popularity of digital photography has continued to grow exponentially as digital cameras have become widespread, whether as stand alone devices or integrated with other devices, such as camera phones. At the same time, technology developments have made it easier to share photographs, for example, by emailing digital photographs, posting digital photographs on personal webpages, or posting digital photographs on photo-sharing websites. As a result, individuals now have access to millions of photographs. While the general availability of photographs provides exciting opportunities, it is difficult for users to sort through such vast numbers of images. Current approaches for searching through images, such as tagging images with keywords, often does not provide a satisfactory user experience. Additionally, current approaches for photograph sharing are fairly dry. Photographs may be sent to a person (e.g., via email) or a site (e.g., a personal webpage or photo-sharing website) and viewed. It is currently possible for users to create more immersive experiences, such as by using tools to create slideshows of images. However, the result still tends to be linear (i.e., progression from one image to another) and in large files that are hard to share.

Fairly recently, a technique has been proposed for generating three-dimensional (3D) environments from two-dimensional (2D) images, such as photographs, and for positioning each of the photographs within the 3D environment. The resulting 3D environment may then be navigated, allowing users to view a collection of images using the 3D environment to provide spatial context. While this technique provides a more immersive user experience, the size of a particular 3D environment may make it difficult to share. Additionally, the 3D environment may become cluttered if an excessive number of images are included.

BRIEF SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to applications that extend the basic concept of determining spatial relationships between images and generating a model allowing users to experience the images in a 3D environment. One application is directed to the creation of documents that may be readily shared, viewed, and edited. Such a document includes references to underlying content comprising a 3D environment and images positioned therein and captures connections between images, which define one or more paths through the underlying content. Another application relates to ranking images based on user viewing information, such as the number of users who have viewed an image and how long an image was viewed. Yet another application is directed to analyzing the spatial density of images within a 3D environment. A further application relates to using images to navigate between webpages and 3D environments. A variety of additional applications are also described herein.

BRIEF DESCRIPTION OF THE SEVERAL VIEWS OF THE DRAWING

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide applications that expand on the basic concept of using a collection of images to generate a 3D environment in which the images are positioned based on spatial information associated with each image.

Exemplary Operating Environment

Figure 1:
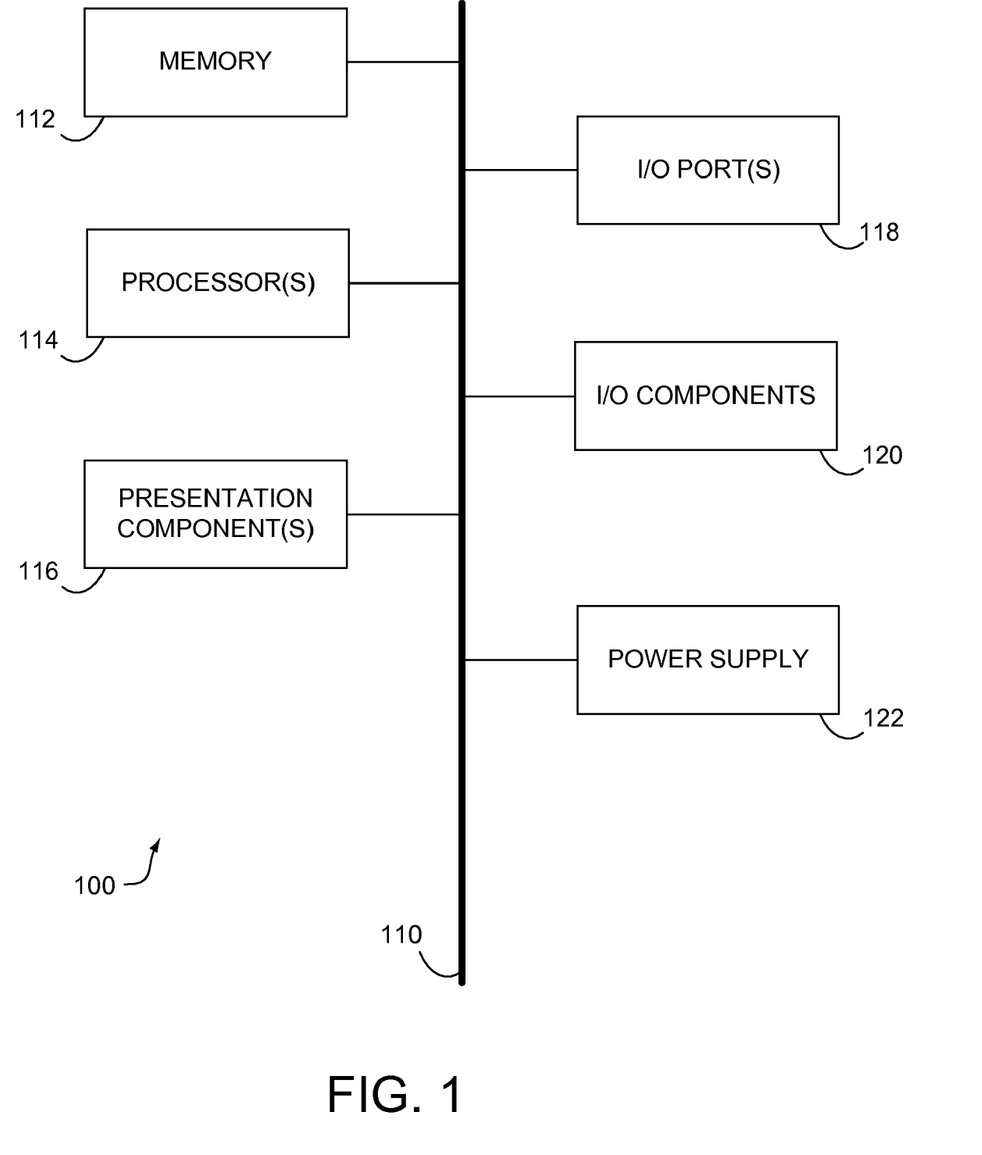
FIG. 1 is a block diagram of an exemplary computing environment suitable for use in implementing the present invention.

Having briefly described an overview of the present invention, an exemplary operating environment in which various aspects of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other medium that can be used to encode and store desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Generation of 3-Dimensional Environments from Images

Embodiments of the present invention build upon the underlying technique of building three-dimensional environments (3D) from two-dimensional (2D) digital images. Generally, the technique uses a collection of photographs located in a geographically contiguous area (e.g., a famous tourist site). These photographs may be a user's personal photographs or may be obtained for a variety of sources, such as photo-sharing sites. The technique matches the photographs, estimates the relative 3D positions of the photographs, and constructs a model of the 3D environment. The complexity of the model may vary in different embodiments and may range from a sparse (point cloud) model to a complete 3D texture-mapped model. The photographs are positioned within the 3D environment based on the spatial information derived for each of the photographs. A user may navigate through the 3D environment and the photographs. Navigating from photograph to photograph maintains the full realism of each photograph, and uses the 3D model principally to organize the photographs spatially and create transitions between them that preserve their geometric relationships.

Figure 2A:
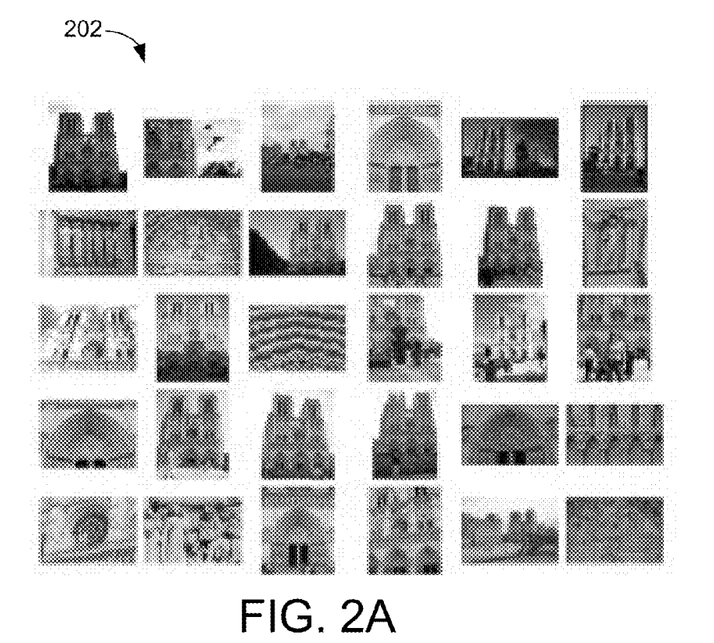
FIGS. 2A and 2B illustrate a collection of photographs and a 3D environment generated from the photographs, respectively.
Figure 2B:
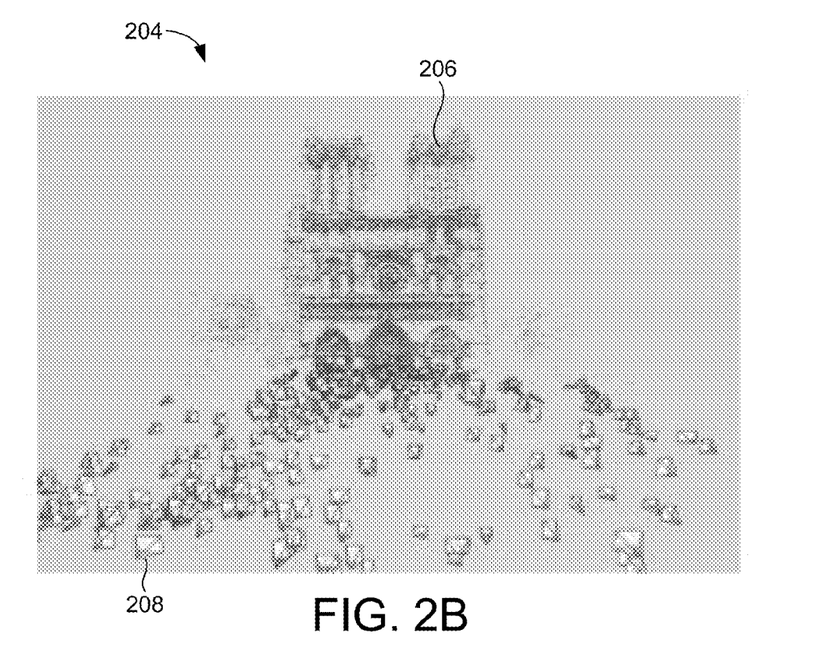

An example of a 3D environment created using the above-described technique is illustrated in FIG. 2B. In particular, a collection of photographs 202 of the Notre Dame cathedral in Paris, such as those shown in FIG. 2A, were used to generate the 3D environment 204 shown in FIG. 2B. The technique determined the 3D locations of the images within the collection and generated a sparse 3D model 206, which comprises a point cloud model of the scene, as shown in FIG. 2B. The images are shown as frusta (e.g., frustum 208) within the 3D environment and are located based on their respective 3D locations.

It should be noted that although photographs are most likely the primary images that may be used to create and/or are included in such 3D environments, a variety of other 2D images may also be employed. For example, video images may be included by taking one or more frames of the video and positioning the video within the 3D environment based on spatial information associated with the frames. Additionally, artwork images, such as paintings or sketches, may also be similarly positioned in the 3D environment. As indicated above, the images may be collected from a variety of different sources within the scope of the present invention, such as, for example: a user's personal collection; photo-sharing sites; images located within webpages; and live (real-time or near real-time) feeds from cell phones and web-cams.

While the above-described technique provides a rich way to experience photographs in a natural 3D setting, the implications of this work are much wider reaching. A wide variety of applications are enabled and discussed in detail in the following sections.

Document Creation, Editing, Viewing and Sharing

Although the generation of 3D environments as described hereinabove provides a rich user experience by allowing users to view 2D images, such as photographs, within a 3D scene that organizes the images spatially, the user experience could be further enhanced. In particular, the availability of images from different sources allows for the generation of 3D environments for a large collection of images. As a result, the 3D environment may be difficult to share between users. Additionally, a large number of images may cause the scene to be cluttered, detracting from the user experience. Further, users may want to provide a more structured experience than that provided by general navigation tools that allow users to freely navigate the 3D environment. For example, users may wish to use the environment to tell stories, give tours, or otherwise provide a more structured way of viewing.

Accordingly, in an embodiment of the present invention, users may create documents that may be readily shared, viewed, and edited. Instead of containing the content itself, the document includes references to underlying content, which includes a 3D environment with images positioned therein. The references may include only a subset of the images within the 3D environment. Additionally, the document defines connections between the images. The connections between images represent a path or set of paths through the 3D environment and images. In one embodiment, this may be a linear path through the 3D environment from a starting point to an ending point. In another embodiment, this may be multiple paths with decision points connecting the various paths, creating a grid-like environment that may be traversed by a viewer. The connections between images are primarily spatial, but may also be based on other dimensions, such as subject, contents, time, and author. Additionally, the connections may be created automatically by the system using some heuristics, or can be authored manually by a user.

In addition to connections between images that represent paths through a 3D environment, the document may include links to other types of content, such as annotations, audio narration, and ambient audio. In some cases, these other content types may be associated directly with a particular image. For example, an audio narration describing an object in an image may be linked to that image. In other cases, these other content types may be associated with connections between images or may simply exist in the document. For example, an object may be shown using a number of photographs taken from different angles and viewpoints. An audio narration discussing the object could be linked to this series of photographs. As another example, users may wish to include ambient audio recorded from the location the 3D environment represents. Instead of being linked to a particular image or set of images, the ambient audio may simply be repeated throughout the viewing experience.

In some embodiments, multiple people may work to create and/or edit a document in a collaborative way. For example, users may collaborate to tell a story of an event set in a particular location or to create a compelling advertisement for a shopping complex. Such a collaborative authoring process may be Wiki-like. There may be an overall owner of the document, but other users may edit it. A history of edits is preserved so that corrections may easily be made.

Figure 3:
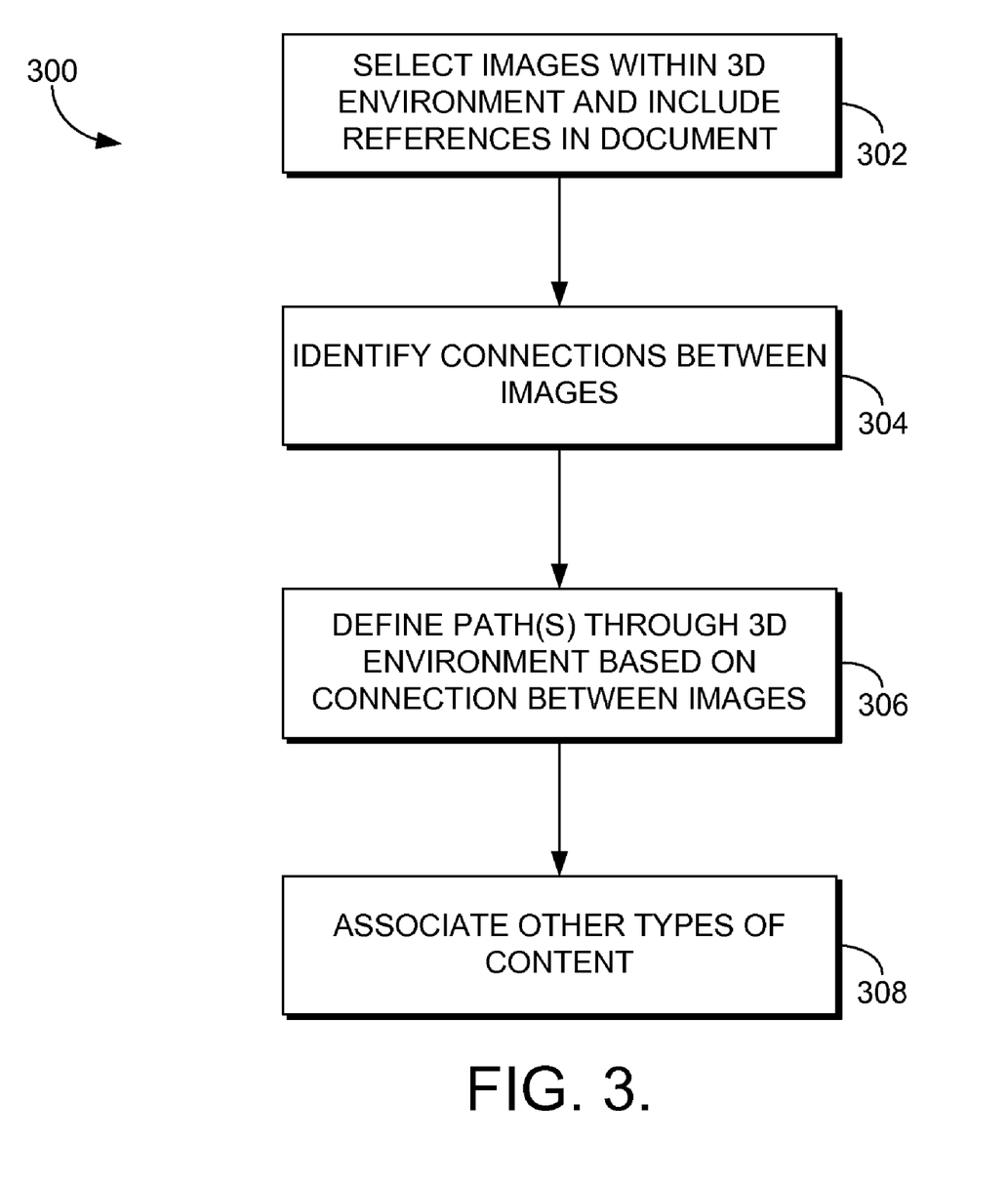
FIG. 3 is a flow diagram showing an exemplary method for creating a document defining connections between images in a 3D environment, in accordance with an embodiment of the present invention.

Turning to FIG. 3, a flow diagram is provided illustrating an exemplary method 300 for creating a document in accordance with an embodiment of the present invention. As shown at block 302, images within a 3D environment are selected and references to the images are included within the document. As indicated previously, a 3D environment may include too many images to provide a satisfying user experience. Accordingly, only a subset of the images may be selected for the document.

As shown at block 304, connections between images are identified. Typically, the connections are based on spatial relationships between images, such as images showing different perspectives of a common object or images that show adjacent objects within the 3D environment. In some cases, the connections may be based on other dimensions, such as subject, contents, time, and author.

One or more paths through the 3D environment are defined based on the connections between images, as shown at block 306. As indicated above, this may include a single, linear path through the 3D environment or may include a number of paths connected by one or more decision points.

Other types of content may also be associated with the document, as shown at block 308. These other types of content may include content added by users, for example, to tell a story, provide a tour, or to otherwise provide a richer experience. For example, the content may include annotations, audio narration, and ambient audio.

User Viewing Patterns

Information regarding user viewing patterns, such as how users navigate and view images within a 3D environment, may be useful to provide a more satisfying user experience. For instance, in an embodiment of the present invention, images within a 3D environment may be ranked based on user viewing information, such as the number of users who have viewed a particular image and/or how long users have viewed the image (i.e., a dwell time). By ranking images, images that are more representative, pleasing, and/or interesting to users may be identified. This is particularly useful when thousands or even millions of images may be available for a given 3D environment, causing clutter within the 3D environment. To reduce image clutter, higher ranking images may be selected for presentation, while lower ranking images may be removed. In some embodiments, to prevent a sort of self-fulfilling prophecy in which higher ranking images are arbitrarily maintained at a higher ranking due to their continued presentation, some lower ranking images may be selected and included for presentation. This provides an opportunity for lower ranking images (e.g., images that are newly added to the 3D environment) to establish a higher ranking. As a result, the system can accurately reflect what is trying to be measured, which is users' preferences. In addition to selecting images, image rankings may be used to automatically identify connections between images.

Figure 4:
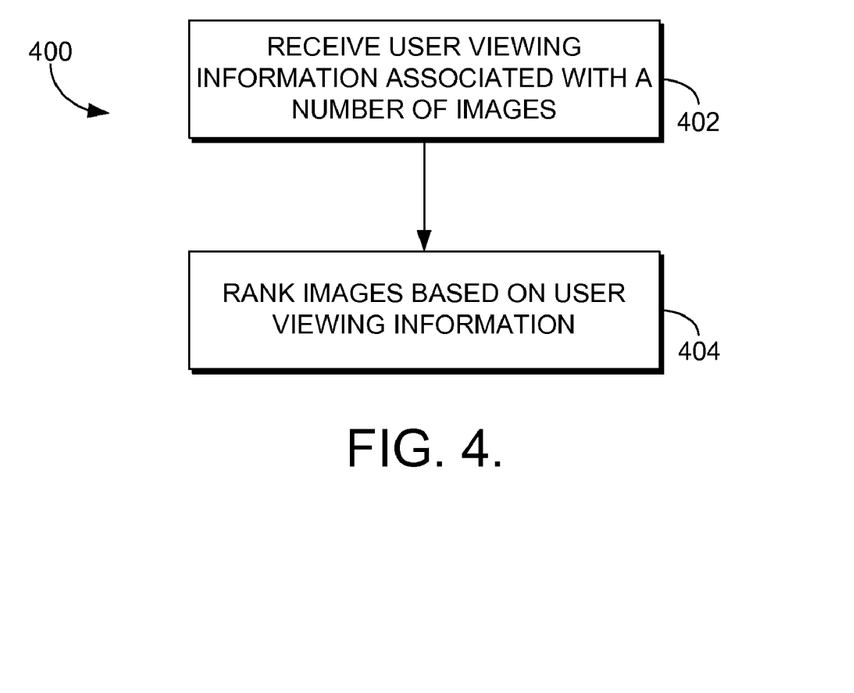
FIG. 4 is a flow diagram showing an exemplary method for ranking images, in accordance with an embodiment of the present invention.

Referring to FIG. 4, a flow diagram is provided showing an exemplary method 400 for ranking images in accordance with an embodiment of the present invention. As shown at block 402, user viewing information for a number of images is received. As indicated previously, the user viewing information for each image may include information such as the number of users who have viewed a particular image and the amount of time the image was viewed. As shown at block 404, the images may be ranked based on the user viewing information.

Image rankings may be particularly useful for the automatic creation and editing of documents described hereinabove. In particular, image rankings determined from user viewing patterns within a 3D environment may be used to generate a document by automatically selecting images and paths through the 3D environment. Additionally, image rankings may be determined for a particular document by analyzing user viewing patterns of the document. These image rankings may be used to further refine the document by identifying user preferences for images and paths.

In addition to user viewing information associated with each image, user navigational information may be collected for a 3D environment and used to provide a better user experience. The user navigational information may include information regarding paths taken by users through a 3D environment. As such, the user navigational information may allow for the automatic identification of connections between images, as well as the selection of paths through the 3D environment, for example, for automatically generating tours as described hereinabove.

Analysis of Image Spatial Density

In another embodiment of the present invention, the spatial density of images within a 3D environment may be analyzed and a variety of applications employing such spatial density information may be realized. In particular, the spatial density of images within a 3D environment provide information regarding what people are looking at in the real world that the 3D environment represents. Additionally, the spatial density of images provides information regarding the movement patterns of people through the real world. Accordingly, by analyzing the spatial density of images within a 3D environment, points of interest to users and paths traveled by users may be identified.

Figure 5:
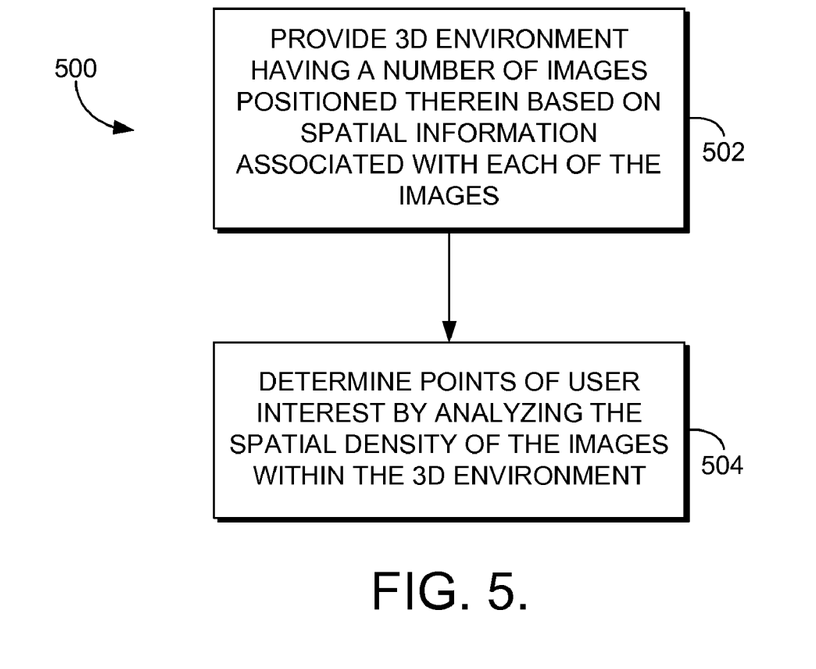
FIG. 5 is a flow diagram showing an exemplary method for determining points of user interest based on the spatial density of images positioned in a 3D environment.

A flow diagram showing an exemplary method 500 for using spatial density information to determine points of user interest is provided in FIG. 5. As shown at block 502, a 3D environment is provided having a plurality of images positioned therein based on spatial density information associated with each of the images. Points of interest are then determined by analyzing the spatial density of the images within the 3D environment, as shown at block 504.

One application of such spatial density information is to enhance user experiences within a 3D environment. For instance, spatial density information may be used to winnow down images to prevent excessive clutter that may result from an excessive number of available images for a particular 3D environment. Additionally, spatial density information may be used to automatically select paths through the 3D environment, for example, for the creation of tours through a 3D environment. This may provide more pleasing stories or tours and more immersive experiences.

A variety of real world applications may also be realized by employing spatial density information for images within a 3D representation. For example, spatial density information may be used to: determine placements of advertising in the real world; set advertisement pricing, rent amounts, and real estate pricing; build up advertising along often traveled routes, optimize pedestrian traffic planning, and to tailor real world tours. One skilled in the art will recognize that many other real world applications may be realized from spatial density information collected from a 3D representation of the real world in accordance with embodiments of the invention.

Navigating between Images in Webpages and 3D Environments

In yet another embodiment of the invention, webpages may be seamlessly linked to points of interest in 3D space allowing users to navigate between webpages and 3D environments. In particular, users may "dive into" 3D environments from images on webpages. Conversely, users may "dive out of" 3D environments to webpages. Combining these aspects with the ability to navigate among different images in a 3D environment provides a new approach for users to navigate between webpages. For example, a user may "dive into" a 3D environment from an image in a first webpage. The user may then navigate to another image in the 3D environment, and use that image to "dive out of" the 3D environment to a second webpage containing that image.

Figure 6:
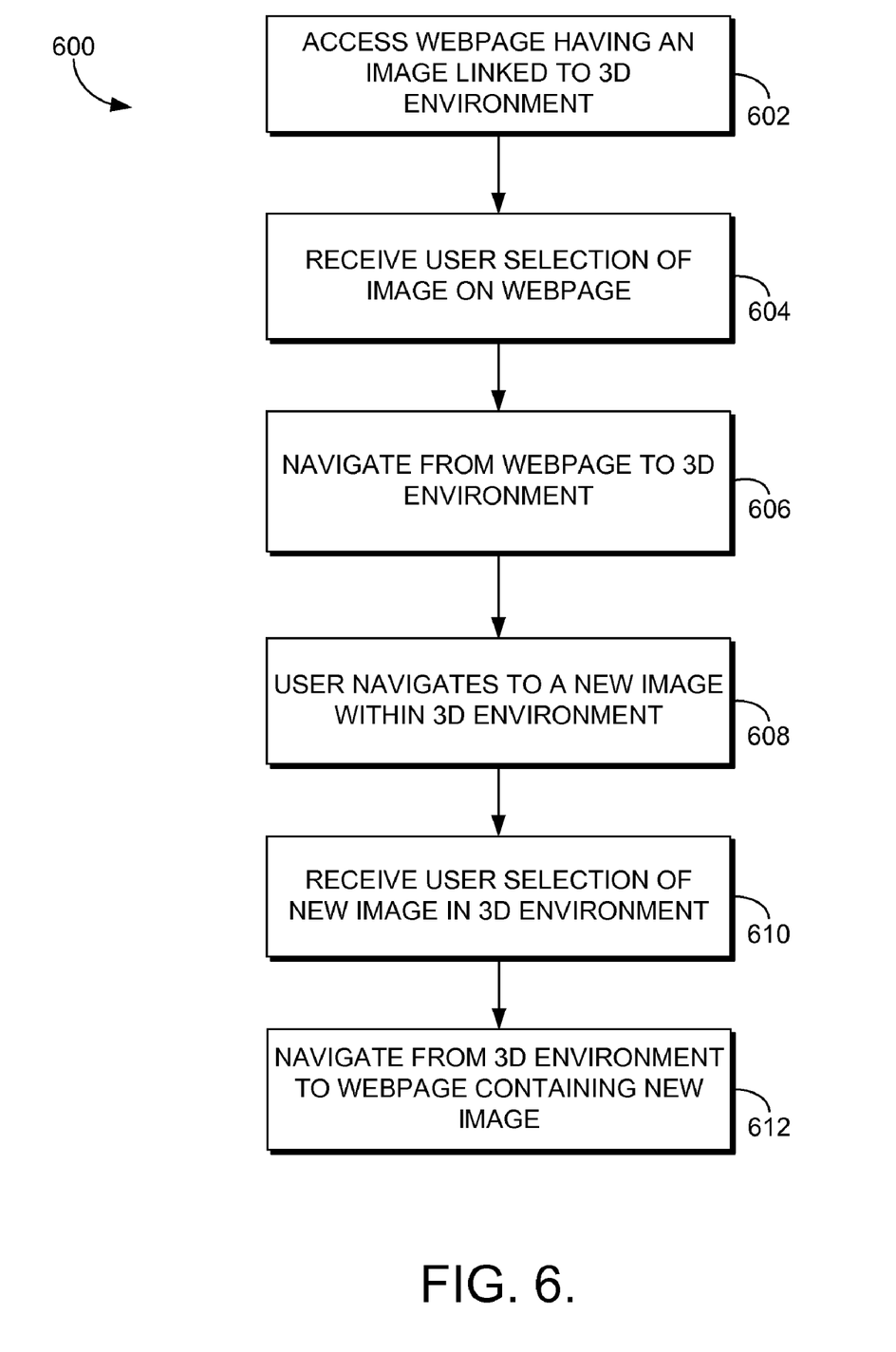
FIG. 6 is a flow diagram showing an exemplary method for navigating between images in webpages and 3D environments, in accordance with an embodiment of the present invention.

Referring to FIG. 6, a flow diagram is provided illustrating an exemplary method 600 for navigating between a webpage and a 3D environment in accordance with an embodiment of the present invention. FIG. 6 illustrates the concept of "diving into" a 3D environment from an image in a webpage, as well as "diving out of" the 3D environment to the same or another webpage. Initially, as shown at block 602, a user may access a webpage having an image. The image includes a hyperlink to a 3D environment, which includes that image, as well as other images, positioned within the 3D environment based on spatial information associated with each image. As shown at block 604, the user selects the image within the webpage. In response to the user selection, the user is navigated from the webpage to the 3D environment, as shown at block 606. In some embodiments, the 3D environment is presented from a position within the 3D environment based on the spatial information associated with the image that was in the webpage. In other words, the 3D environment is presented from the viewpoint of that image.

After "diving into" the 3D environment, the user may choose to navigate through the 3D environment and view other images. Some of the images within the 3D environment may include hyperlinks to webpages in which the images are located. As shown at block 608, the user navigates to a new image in the 3D environment. The new image includes a hyperlink to another webpage. As shown at block 610, the user selects the image in the 3D environment. By selecting the image, the user is navigated from the 3D environment to a webpage containing that new image, as shown at block 612.

By way of an example, a user may access a friend's webpage that includes a discussion of the friend's trip to Paris. The webpage may also include a number of photographs taken by the friend during the trip, including a photograph of the front of the Notre Dame cathedral. The photograph has been located within a 3D environment of the Notre Dame cathedral, such as that shown in FIG. 2B, and includes a hyperlink to that 3D environment. When the user selects the image, the user is navigated to the 3D environment, which is presented from the viewpoint of the photograph from the friend's webpage. The user may then choose to navigate through the 3D environment and view other images of the Notre Dame cathedral. Some of these images may have hyperlinks to webpages that contain the respective images. For instance, the user may navigate to an image, which comprises a close-up photograph of the central front door to the cathedral. The photograph may include a hyperlink to a tourism webpage that includes the photograph. By selecting the photograph, the user is navigated from the 3D environment to the tourism webpage.

Navigating between Aerial Imagery and 3D Environments

A variety of web sites, such as TerraServer, Virtual Earth, and Google Maps, are available that allow users to navigate aerial photographs. The websites allow users to view aerial photographs of different regions of the world, as well as to zoom between higher and lower level aerial images. However, users may be dissatisfied when the lowest level aerial photographs do not provide sufficient detail. In particular, users may also wish to view and navigate through street-level images.

Another embodiment of the invention provides an improved user experience by allowing users to navigate from aerial photographs to 3D environments that have been generated from and include 2D terrestrial images. Accordingly, users may be able to fly continuously from high level aerial photographs to a street-level experience. As a user navigates from high level aerial photographs to lower level aerial photographs, a level may be reached in which the user is seamlessly transitioned from an aerial photograph to a 3D environment containing a variety of 2D terrestrial images of the area. The user may then navigate through the 3D environment and also transition from the 3D terrestrial environment to the aerial photographs.

Interior Space 3D Environments

In addition to 3D environments for outdoor spaces and scenes, 3D environments of interior spaces may also be generated and navigated using 2D images of the interior spaces. Such 3D environments of interior spaces present a new form of virtual tours that may be provided for real estate, apartments, and businesses, such as restaurants, stores, and museums, for example. Allowing users to navigate through 3D environments of interior spaces using 2D images of the spaces presents a variety of possibilities, such as for selling real estate, advertising rental properties, or marketing a business.

Additionally, 3D environments of outdoor spaces may be connected directly with 3D environments of interior spaces. Images within a 3D environment of an outdoor space could be used as an entry point to a 3D environment for an interior space. As an example, a 3D environment could be generated of an area having a number of shops and restaurants. The 3D environment could allow a user to navigate through images of the area and select an image linked to a 3D environment of an interior of one of the shops or restaurants. The image could include a doorway to a restaurant, for example, that when selected transitions from the 3D environment for the outdoor space to the 3D environment for the restaurant. The user could then navigate through the 3D environment for the restaurant.

Facilitating Searching

There are numerous possibilities for linking geographic searches to 3D environments. Direct semantic connections among webpages can also be inferred when they include photographs taken from (or of) nearby locations; for both search and navigation purposes, this can be thought of almost as a hyperlink.

An additional implication is that photographs become the catalyst for creating semantic connections—something the Web has been trying to do for some years. This is not so surprising considering the density of information in an image. Although today images are mostly opaque, advances in object recognition/categorization in conjunction with this technology will unlock some of that data, while at the same time preserving connections between images.

The advent of searching as the primary means of navigating to a webpage altered the way content was authored (most infamously, with hidden keyword pages). Similarly, although many of the web-photo hybrid possibilities summarized above can be enabled in the browser without any special content authoring or change in the web ecosystem, new authoring modalities are likely to emerge, in which the "linkable" nature of images is exploited to create portals and connect environments.

Live Feeds and Real-Time/Near Real-Time Images

Live cell phone and web-cam images and video streams could also be integrated into 3D environments as live elements. Potential applications include live news gathering, reviewing concert footage from multiple vantage points, sharing wedding photos, enhancing the effectiveness of watchdog organizations such as World Watch, and empowering children in developing countries with cameras.

Creation of 3D Environments for 3D Objects

Another application of this technology is in the visual exploration of 3D objects, especially objects that might be of interest to collectors, aficionados, or for Web-based sales. Automatically building high-quality 3D models from images has proven to be a challenging problem that is not yet adequately solved. Photograph tours of objects in accordance with embodiments might bridge the gap between random collections of photographs and true 3D models with an experience that is intuitive and visually appealing.

CONCLUSION

As can be understood, embodiments of the present invention provide applications the extend the basic concept of generating 3D environments from 2D images and allowing user to navigate the 3D environments. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer-readable media having computer-useable instructions embodied thereon that, when executed by at least one processor, cause the at least one processor to perform a method for creating a document, the method comprising:

receiving a selection of a subset of two-dimensional (2D) images from a plurality of 2D images of a geographically contiguous area in the real-world, wherein the subset of 2D images is selected from a three-dimensional (3D) environment comprising a 3D model automatically generated from the plurality of 2D images, the 3D environment and 3D model representing the geographically contiguous area in the real-world corresponding with the plurality of 2D images, and wherein each of the plurality of 2D images is automatically located within the 3D environment based on spatial information derived from each of the plurality of 2D images;

identifying connections between images within the subset of 2D images, the connections defining one or more paths through the 3D environment by specifying navigation between images within the subset of 2D images within the 3D environment in accordance with the connections; and creating a document containing a reference to each image within the subset of 2D images and an identification of the connections between images within the subset of 2D images.

2. The one or more computer-readable media of claim 1, wherein the plurality of 2D images comprise at least one of a photograph, a video, and an artwork image.

3. The one or more computer-readable media of claim 1, wherein the connections between images within the subset of 2D images are based on at least one of a spatial relationship, a subject relationship, a time relationship, and an author relationship.

4. The one or more computer-readable media of claim 1, wherein the instructions for creating the document include instructions for adding new 2D images to the 3D environment.

5. The one or more computer-readable media of claim 1, wherein the method further comprises associating additional content with the document, the additional content comprising at least one of an ambient audio, an audio narration, and an annotation.

6. The one or more computer-readable media of claim 5, wherein the document further defines a connection between at least one of an ambient audio, an audio narration, and an annotation with at least a portion of the one or more paths through the 3D environment.

7. The one or more computer-readable media of claim 1, wherein the one or more paths through the 3D environment comprise at least one of: a linear path through the 3D environment; and a plurality of paths through the 3D environment having one or more decision points between the plurality of paths.

8. The one or more computer-readable media of claim 1, wherein identifying connections between images within the subset of 2D images comprises automatically determining connections between images based on user viewing information associated with users viewing the images in the 3D environment.

9. The one or more computer-readable media of claim 1, wherein the computer-useable instructions further comprise at least one of instructions for editing the document, instructions for viewing the document, and instructions for sharing the document.

10. The one or more computer-readable media of claim 9, wherein the instructions for editing the document include instructions for editing the document without altering the 3D environment.

11. The one or more computer-readable media of claim 9, wherein the instructions for editing the document include instructions for adding new content to the 3D environment.

12. One or more computer-readable media having computer-useable instructions embodied thereon that, when executed by at least one processor, cause the at least one processor to perform a method of ranking images, the method comprising:
receiving user viewing information associated with each of a plurality of images of a geographically contiguous area in the real-world, each of the images being automatically positioned in a three-dimensional (3D) environment based on spatial information derived from each of the images, the 3D environment comprising a 3D model having been automatically generated from the plurality of images and representing the geographically contiguous area in the real-world;
receiving user navigation information associated with user navigations through the 3D environment;
automatically defining one or more oaths through the 3D environment based on the user navigation information; and
ranking at least a portion of the plurality of images based on the user viewing information associated with users viewing the images within the 3D environment to provide one or more image rankings.

13. The one or more computer-readable media of claim 12, wherein the user viewing information for an image includes information associated with at least one of a number of users who have viewed the image, a user dwell time for the image, and information associated with an author of the image.

14. The one or more computer-readable media of claim 12, wherein the method further comprises controlling the presentation of images based on the one or more image rankings.

15. The one or more computer-readable media of claim 12, wherein the method further comprises automatically defining one or more connections between images based on the one or more image rankings.

16. The one or more computer-readable medium of claim 12, wherein the user navigation information includes information regarding paths taken by users when navigating through the 3D environment.

17. One or more computer-readable media having computer-useable instructions embodied thereon that, when executed by at least one processor, cause the at least one processor to perform a method of using images to determine points of user interest, the method comprising:
providing a three-dimensional (3D) environment having a plurality of images of a geographically contiguous area in the real-world, wherein the 3D environment comprises a 3D model that is automatically generated based on the plurality of images and represents the geographically contiguous area in the real-world, each of the images being automatically positioned in the 3D environment based on spatial information derived from each of the images;
determining connections between images based on a spatial density of the images within the 3D environment;
defining paths through the 3D environment based on the connections between the images determined based on the spatial density of the images within the 3D environment; and
determining points of user interest in the geographically contiguous area in the real-world, by analyzing the spatial density of the images within the 3D environment.

18. The one or more computer-readable media of claim 17, further comprising controlling the presentation of images based on the spatial density of the images within the 3D environment.

19. One or more computer-readable media having computer-useable instructions embodied thereon that, when executed by at least one processor, cause the at least one processor to perform a method for navigating between a first image in a webpage and a three-dimensional (3D) environment having a plurality of images of a geographically contiguous area in the real-world, wherein the 3D environment comprises a 3D model that is automatically generated based on the plurality of images and represents the geographically contiguous area in the real-world, the method comprising:
presenting the first image within the webpage, the first image including a hyperlink to the 3D environment, the 3D environment having the plurality of images automatically positioned therein based on spatial information derived from each of the images, the 3D environment further having the first image positioned therein based on spatial information derived from the first image;
receiving a user selection of the first image within the webpage; and
responsive to the user selection of the first image within the webpage, presenting the 3D environment.

20. The one or more computer-readable media of claim 19, wherein the 3D environment is presented from a position within the 3D environment based on the spatial information associated with the first image.

21. The one or more computer-readable media of claim 19, wherein the method further comprises:
navigating to a second image in the 3D environment, wherein the second image includes a hyperlink to a second webpage, and wherein the second image is included within the second webpage;
receiving a user selection of the second image within the 3D environment; and
responsive to the user selection of the second image within the 3D environment, presenting the second webpage.

22. The one or more computer-readable media of claim 1, wherein identifying connections between images within the subset of 2D images comprises automatically determining connections between images based on the spatial density of the images in the 3D environment.

* * * * *